US006954446B2

United States Patent
Kuffner

(12) United States Patent
(10) Patent No.: US 6,954,446 B2
(45) Date of Patent: Oct. 11, 2005

(54) MULTIPLE MODE RF COMMUNICATION DEVICE

(75) Inventor: Stephen Kuffner, Algonquin, IL (US)

(73) Assignee: Motorola, Inc., Schaumburg, IL (US)

( * ) Notice: Subject to any disclaimer, the term of this patent is extended or adjusted under 35 U.S.C. 154(b) by 291 days.

(21) Appl. No.: 10/179,551

(22) Filed: Jun. 25, 2002

(65) Prior Publication Data

US 2003/0235167 A1 Dec. 25, 2003

(51) Int. Cl.⁷ .................. H04B 7/212; H04M 1/00
(52) U.S. Cl. .............. 370/335; 370/342; 370/444; 455/552
(58) Field of Search .................. 370/208–210, 370/329–350, 444–473; 375/224, 267, 346, 130, 211; 455/426–439, 512–553, 557–575, 450

(56) References Cited

U.S. PATENT DOCUMENTS

| | | | |
|---|---|---|---|
| 5,406,615 A | | 4/1995 | Miller, II et al. |
| 5,420,909 A | * | 5/1995 | Ng et al. .................. 455/426.1 |
| 5,638,055 A | * | 6/1997 | McDonald et al. ......... 455/512 |
| 5,884,189 A | * | 3/1999 | Yamazaki et al. ....... 455/552.1 |
| 5,926,479 A | | 7/1999 | Baran |
| 5,999,990 A | * | 12/1999 | Sharrit et al. .................. 710/8 |
| 6,151,354 A | * | 11/2000 | Abbey ...................... 375/211 |
| 6,163,697 A | * | 12/2000 | Peterson et al. ............ 455/450 |
| 6,169,733 B1 | | 1/2001 | Lee |
| 6,249,686 B1 | * | 6/2001 | Dvorkin et al. .......... 455/552.1 |
| 6,256,511 B1 | * | 7/2001 | Brown et al. ............ 455/552.1 |
| 6,473,037 B2 | * | 10/2002 | Vail et al. .................. 342/372 |
| 6,496,143 B1 | * | 12/2002 | Vail et al. .................. 342/372 |
| 6,549,778 B1 | | 4/2003 | Mulford |
| 6,584,090 B1 | * | 6/2003 | Abdelgany et al. ......... 370/342 |
| 6,690,949 B1 | * | 2/2004 | Shamlou et al. ............ 455/557 |
| 6,697,415 B1 | * | 2/2004 | Mahany ..................... 375/130 |
| 6,708,028 B1 | * | 3/2004 | Byrne ...................... 455/426.1 |
| 6,804,251 B1 | * | 10/2004 | Limb et al. ................. 370/444 |
| 2003/0193923 A1 | * | 10/2003 | Abdelgany et al. ......... 370/342 |
| 2004/0056890 A1 | * | 3/2004 | Hao et al. .................... 345/744 |

* cited by examiner

Primary Examiner—Man U. Phan
(74) Attorney, Agent, or Firm—Daniel K. Nichols; Indira Saladi

(57) ABSTRACT

A multiple mode RF communication device (100), such as a transmitter, receiver or transceiver, has a first RF communication resource (102, 122) that communicates by default using a first communication mode. A second RF communication resource (104, 124) communicates by default using a second communication mode. A system manager (110) deploys the first and second communication resources according to a set of deployment rules, wherein the deployment rules may be dependent upon a communication quality parameter, priorities, availability of the first and second communication resources as well as other parameters.

28 Claims, 5 Drawing Sheets

MULTIPLE MODE RF COMMUNICATION DEVICE

FIELD OF THE INVENTION

This invention relates generally to the field of radio frequency transmitters and receivers. More particularly, this invention relates to a multiple mode transmitter, receiver or transceiver which can be flexibly deployed.

BACKGROUND OF THE INVENTION

Multiple mode transmitters, receivers and transceivers are, for purposes of this document, devices that utilize radio frequency circuitry for communication using multiple transceivers, transmitters and/or receivers. One example might be a radio frequency (RF) wireless cellular telephone device using 800 MHz CDMA (Code Division Multiple Access) technology as a primary communication technology. In addition, the device may incorporate a 1575 MHz GPS (Global Positioning System) receiver that permits the user and the device to determine positioning coordinates from the GPS satellite system. The device may also incorporate, for example, a Bluetooth® compliant 2400 MHz transceiver for carrying out communications with other Bluetooth® standard compliant devices. Such a device therefore can utilize three receivers and two transmitters for carrying out the specified communications.

According to conventional lines of thinking, the above scenario would be implemented using three separate receivers and two transmitters (the GPS device having no associated transmitter) connected to multiple antennas in order to achieve the RF communications. Thus each transmitter, receiver and/or transceiver uses its own resources (i.e., transmitter circuits, receiver circuits and antennas) as dedicated resources. When a particular mode of operation is inactive, there is no facility to marshal the available resources of that inactive mode to improve the performance of the resources currently in use.

Several communications methods have been previously devised to advantageously utilize multiple antennas. Recently, a technology known as MIMO (Multiple Input Multiple Output) has been proposed that utilizes multiple antennas at the input of a receiver and/or multiple antennas at the output of a transmitter to increase the capacity of a communications link by providing multiple independent transmission paths. Spatial, polarization, or pattern diversity provided by multiple antennas can also be advantageously utilized to provide improved resistance to fading by use of the antenna or combination of antennas that provides the best signal. Still, such systems cannot take advantage of idle resources in multiple mode receivers to enhance system performance.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 1 is a block diagram of a communication device consistent with certain embodiments of the present invention.

FIG. 2 is a block diagram of a radio receiver handset consistent with certain embodiments of the present invention.

FIG. 3 is a block diagram of a multiple band, multiple mode transceiver consistent with certain embodiments of the present invention.

FIG. 4 illustrates the multiple band, multiple mode transceiver of FIG. 3 in an exemplary configuration consistent with certain embodiments of the present invention.

FIG. 5 illustrates the multiple band, multiple mode transceiver of FIG. 3 in another exemplary reconfiguration consistent with certain embodiments of the present invention.

FIG. 6 is a flow chart of operation of an embodiment of a system manager consistent with certain embodiments of the present invention.

DETAILED DESCRIPTION OF THE INVENTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

Turning now to FIG. 1, a communication device consistent with certain embodiments of the present invention is illustrated as 100. In this embodiment, communication device 100 has a plurality of N communication resources 102, 104 through 106 that can be deployed under the control of a system manager device 110 in accordance with deployment rules. In general, the communication resources 102, 104 through the Nth resource 106 can be any arrangement of configurable transmitters, receivers or transceivers (combination transmitters and receivers) whose personality and operational parameters (carrier, frequency band, modulation scheme, encryption/decryption, data protocol, etc.) can be configured and reconfigured under control of system manager 110. The communication resources 102, 104 through 106 utilize N separate antennas 122, 124 through 126 respectively in this example, but this does not preclude multiple antennas being allocated to any or all of the communication resources in a diversity or MIMO arrangement.

By way of a simple example, communication resource 102 might, by default, be an 800 MHz CDMA2000 receiver and communication resource 104 might, by default, be a 1575 MHz GPS receiver. The "default" mode of operation can be considered a normal mode or an initial mode of operation of that resource as directed by the system manager 110, but can be subsequently reassigned as will be described. Continuing with this example, if the deployment rules say that communication resource 102 has priority over communication resource 104, and the signal quality deteriorates at communication resource 102, communication resource 104 could be reconfigured under control of system manager 110 to operate as an 800 MHz CDMA2000 receiver.

Each of the communication resources may provide feedback to the system manager 110 for use in applying the deployment rules to establish a desired configuration of each of the communication resources in the system 100. This feedback may be in the form of measured or received signal quality, or any other data that can be used by the system manager 110 to factor into a determination on resource deployment. The deployment rules can vary from user to user and system to system based upon, for example, user preferences, priority definitions, default system configuration, hardware and software constraints, etc. Although not explicitly shown, those skilled in the art will appreciate that certain common resources might also be present in system 100 such as audio circuits, loudspeakers, power supplies, audio filters, etc.

Thus, in accordance with the above arrangement, a multiple mode RF communication device can have a first RF communication resource (e.g., 102 and 122) that communicates by default using a first communication mode (i.e., frequency band, protocol, operational mode and/or other operational parameters). A second RF communication resource (e.g., 104 and 124) communicates by default using a second communication mode. The system manager 110 deploys at least one of the first and second communication resources according to a set of deployment rules. The deployment rules can be dependent upon a communication quality parameter, priorities, availability of the first and second communication resources, or other parameters.

Figure 1:
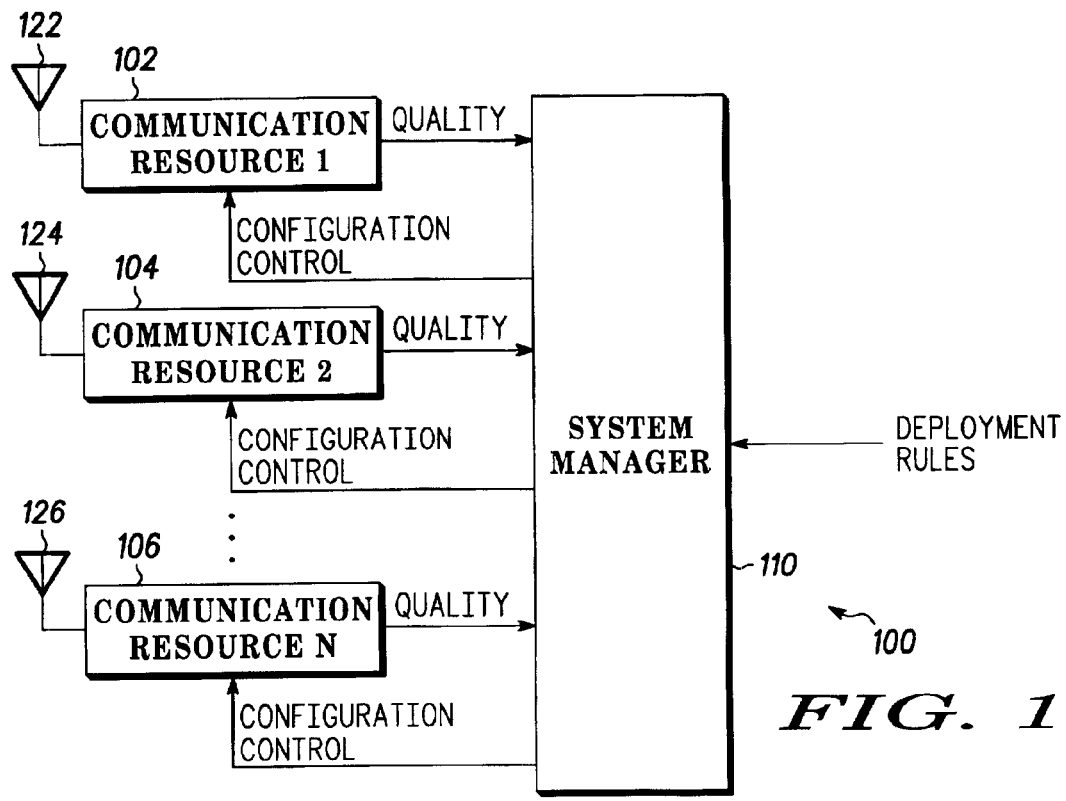
Figure 2:
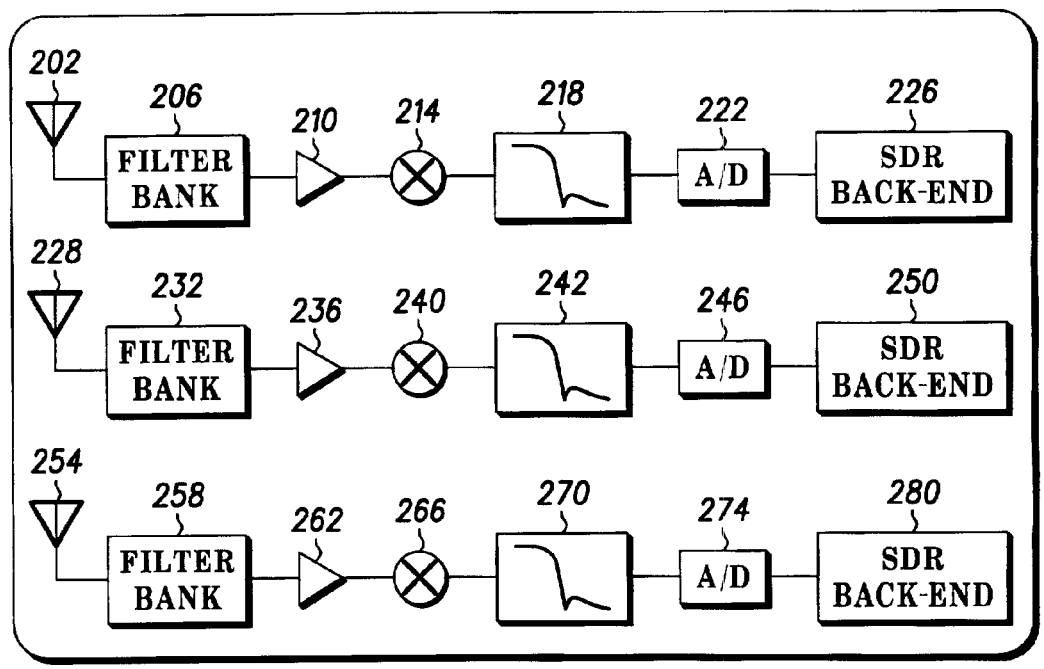

FIG. 2 illustrates an exemplary embodiment of a radio handset 200 consistent with certain embodiments of the present invention. In this embodiment, the system manager 110 is not illustrated to simplify the drawing, but its presence will be understood. This handset incorporates three configurable receivers (any of which may be used in conjunction with a transmitter to form a transceiver) that assume a personality under the instructions of the system manager 110. A first receiver is made up of an antenna 202 that is coupled to a filter bank 206. Filter bank 206 may have multiple switchable filters or equivalently one or more electronically tunable filters. The filtered output from filter bank 206 is fed to an RF amplifier 210 where the signal is amplified and fed to a mixer 214 (or pair of mixers if the signal is processed using quadrature processing techniques). The mixed signal is then baseband filtered at 218 and converted to digital for processing by a receiver back-end 226. In this exemplary embodiment, the receiver back-end is shown as a Software Defined Receiver (SDR) back-end 226, but this should not be considered limiting, since other arrangements including, but not limited to, hardware switched receiver back-end circuits could also be used.

A similar arrangement is provided in a second receiver that has an antenna 228 that is coupled to a filter bank 232. Filter bank 232 may similarly have multiple switchable filters or equivalently one or more electronically tunable filters. The filtered output from filter bank 232 is fed to RF amplifier 236 where the signal is amplified and fed to a mixer 240 (or pair of mixers if the signal is processed using quadrature processing techniques). The mixed signal is then baseband filtered at 242 and converted to digital for processing by a receiver back-end 250. Again, in this exemplary embodiment, the receiver back-end 250 is also shown as a Software Defined Receiver (SDR) back-end, but this should not be considered limiting.

A similar arrangement is provided in a third receiver that has an antenna 254 that is coupled to a filter bank 258. Filter bank 258 may similarly have multiple switchable filters or equivalently one or more electronically tunable filters. The filtered output from filter bank 258 is fed to RF amplifier 262 where the signal is amplified and fed to a mixer 266 (or pair of mixers if the signal is processed using quadrature processing techniques). The mixed signal is then baseband filtered at 270 and converted to digital for processing by a receiver back end 280. Again, in this exemplary embodiment, the receiver back-end 280 is also shown as a Software Defined Receiver (SDR) back-end, but this should not be considered limiting.

Those skilled in the art will appreciate that this example uses a direct conversion architecture to take the RF signal to baseband, but other configurations including, but not limited to, double conversion or direct RF sampling receivers, or receivers that sample and convert to digital at an IF instead of baseband, could also be used without departing from the invention. Other known configurations can also be adapted to use with the multiple mode communication device without departing from the present invention.

Each of the three example receivers may, in general, have a default personality. That is, at power up or under a given set of field circumstances or user assignment, each of the three receivers operates with a default receiving band, demodulation scheme, decoding protocol, decryption algorithm (where applicable), etc. Under the direction of the system manager 110, applying a set of rules that define circumstances under which a configuration is to change, the configuration of any or potentially all of the receivers may be reconfigured to operate in a different manner. Thus, in this manner, the receivers may be redeployed to maximize the utilization of resources and achieve enhanced communication reliability or other objectives. In accordance with certain embodiments, the user may determine a default configuration for each of the receivers that can be altered by the system manager 110 if the deployment rules in effect deem it to be appropriate.

Thus, in accord with the example of FIG. 2, a multiple mode RF communication device has a first RF communication receiver that by default receives RF signals using a first communication mode. A second RF communication receiver by default receives signals using a second communication mode. System manager 110 deploys at least one of the first and second communication receivers according to a set of deployment rules, wherein the deployment rules may be dependent upon a communication quality parameter, priorities, availability of the first and second communication receivers as well as any other suitable parameters. Similarly, the third receiver may be redeployed as desired or needed under a given set of circumstances. Thus, any of the three receivers in this example may be redeployed to carry out a desired action.

Figure 3:
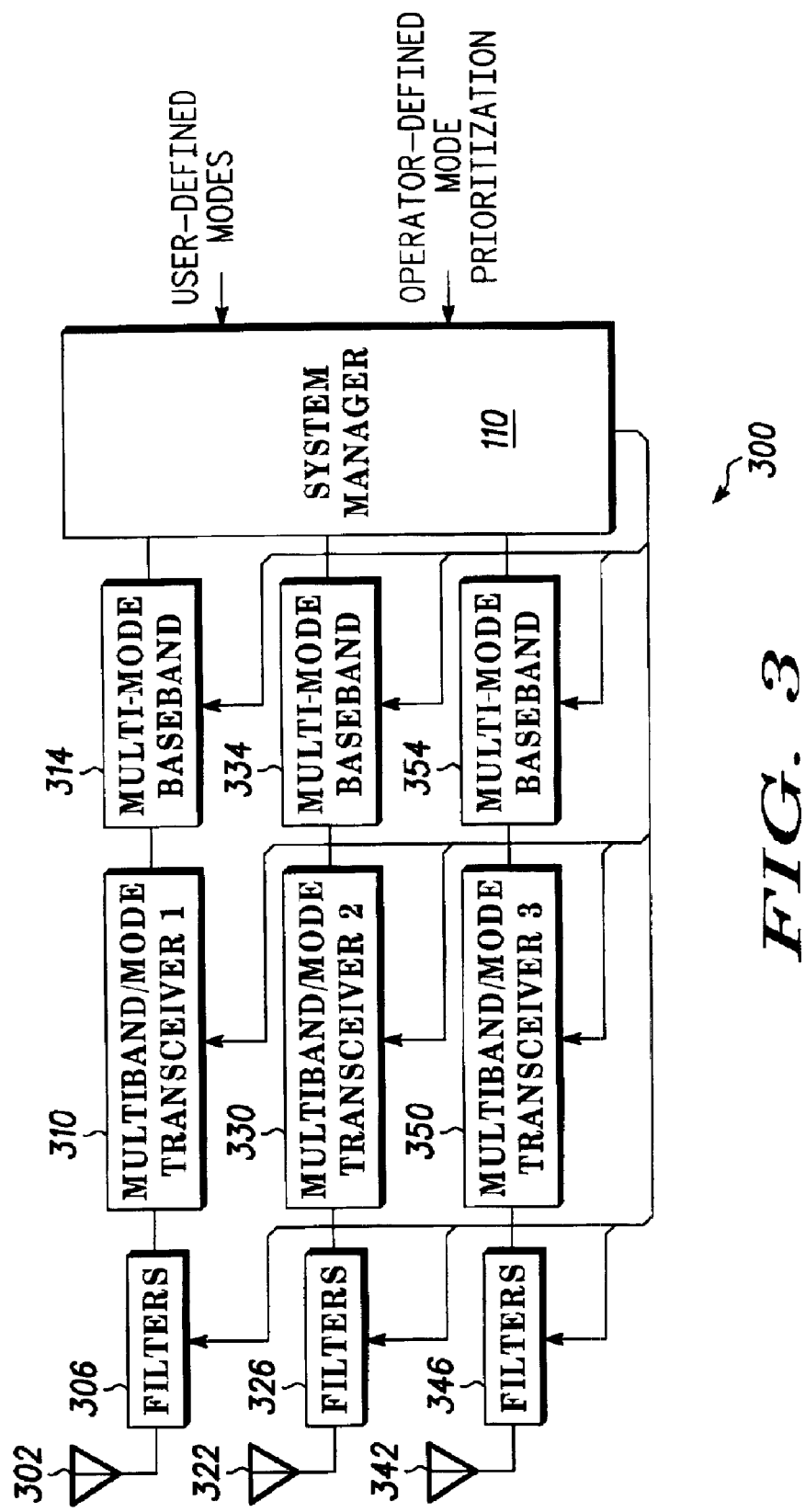

Turning now to FIG. 3, another exemplary embodiment of a multi-mode communication device 300 is illustrated wherein three transceivers are illustrated as operating under the direction of system manager 110. In this example, the system manager 110 receives instructions from a user to define the default operational modes (user-defined modes) used by the three receivers as an input provided, for example, by user input through a keypad forming a part of a user interface. Priority data is also provided to the system manager 110 (operator-defined mode prioritization) as an input that defines operational priorities for each of the operational modes. This operator-defined mode prioritization can be defined within the system manager 110's software, downloaded dynamically over the air as control information on a case-by-case basis, assigned by the user or otherwise received for factoring into the deployment rules. Using this input, the system manager issues configuration control commands to the reconfigurable elements of the three transceivers of the current exemplary embodiment whenever the deployment rules dictate such a reconfiguration.

The first transceiver of system 300 has an antenna 302 that is connected to filters 306 and then to a multi-band, multi-mode transceiver 310. The multi-band, multi-mode transceiver 310 is in turn connected to a multi-mode baseband circuit 314 that carries out baseband processing of the transmitted and received signals. Multi-mode baseband circuit 314 provides feedback data to the system manager 110 in this embodiment.

The second transceiver of system 300 has an antenna 322 that is connected to filters 326 and then to a multi-band, multi-mode transceiver 330. The multi-band, multi-mode transceiver 330 is in turn connected to a multi-mode baseband circuit 334 that carries out baseband processing of the transmitted and received signals. Multi-mode baseband circuit 334 also provides feedback data to the system manager 110.

The third transceiver of system 300 has an antenna 342 that is connected to filters 346 and then to a multi-band, multi-mode transceiver 350. The multi-band, multi-mode transceiver 350 is in turn connected to a multi-mode baseband circuit 344 that carries out baseband processing of the transmitted and received signals. Multi-mode baseband circuit 344 also provides feedback data to the system manager 110.

Figure 4:
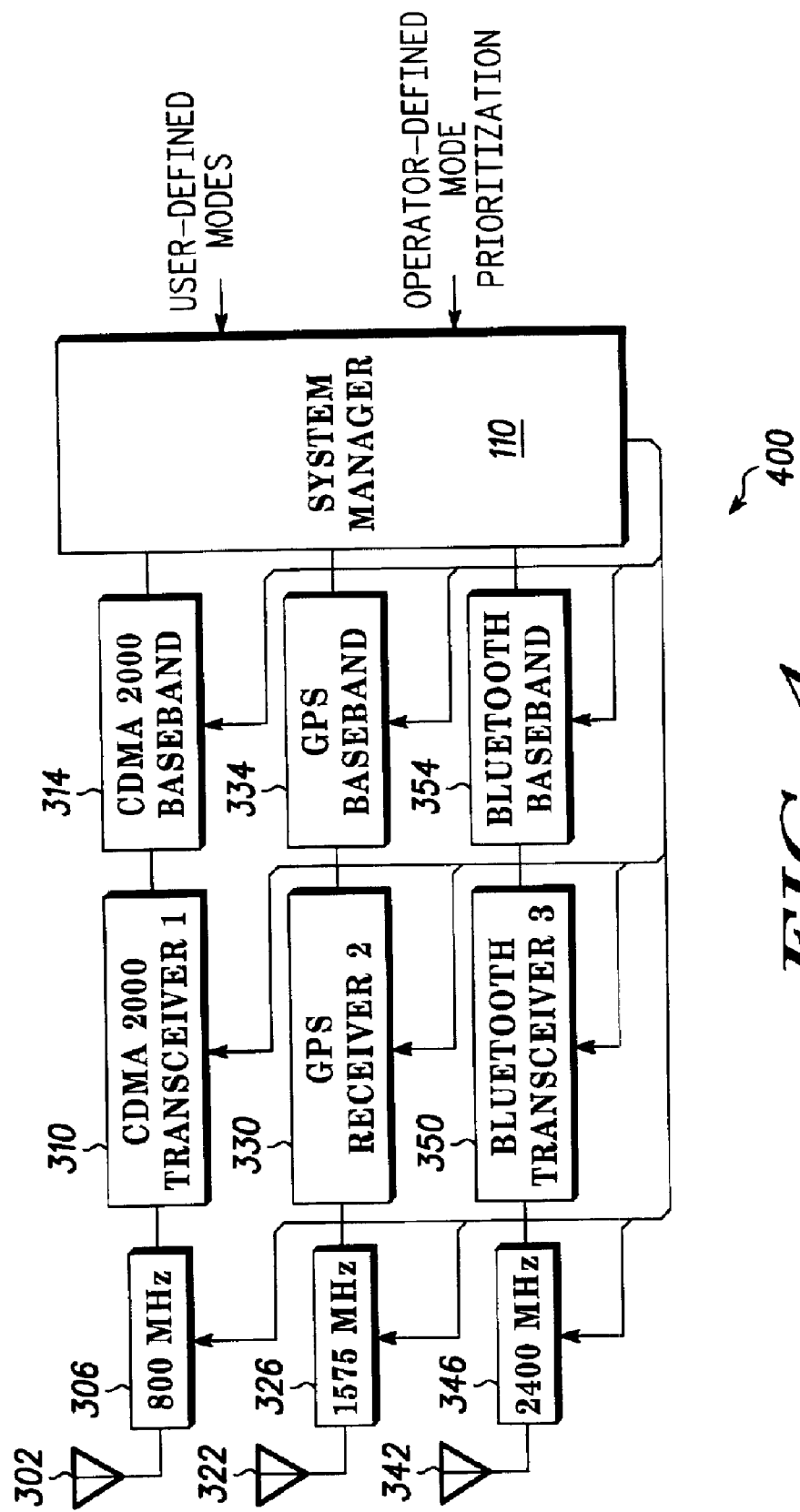

The arrangement of FIG. 3 may be deployed, by way of example and not limitation, as the transceiver system 400 shown in FIG. 4. In this arrangement, the first transceiver is deployed by default as an 800 MHz CDMA2000 transceiver, the second transceiver is deployed by default as a 1575 MHz GPS receiver and the third transceiver is deployed by default as a 2400 MHz Bluetooth® transceiver.

Figure 5:
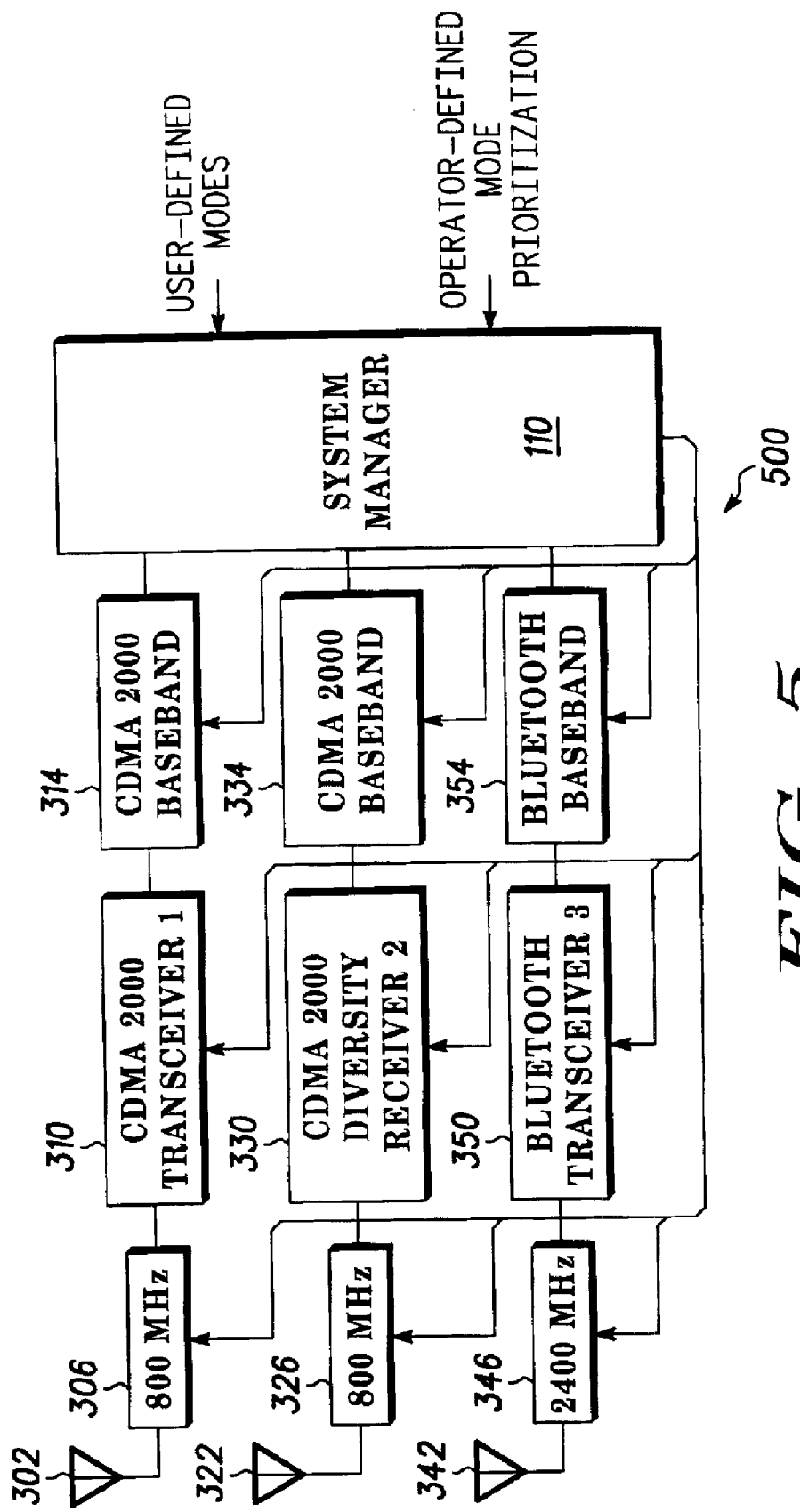

In the arrangement of FIG. 4, the user determines which modes are being used and the system manager deploys the resources (e.g., first transceiver for cellular air interface such as CDMA2000 for voice communication, second transceiver for a short distance Wireless Personal Area Network (WPAN) mode such as Bluetooth® for headset link, third transceiver for location mode such as GPS for charges/location-aware services). The system operator in this embodiment determines priority of services. For example, if it is more important to maintain a high quality voice link than to constantly maintain location awareness, CDMA2000 has priority over GPS and the GPS receiver may be re-deployed, for example as a CDMA2000 diversity receiver as shown in system 500 of FIG. 5. Due to the different physical location and position/orientation of the two antennas, one antenna may have a reception advantage over the other in view of objects in proximity to the communication device. Alternatively, the signals from the two receivers may be combined in one of several methods known in the art, such as 'max ratio' combining, that gives better performance than either of the receivers taken individually. The deployment priority may be defined a-priori based on a look-up table of combinations of modes, or in real time as control information from the operator, based on feedback about link or voice quality and the mode configuration of the other resources. Transceiver resources are redeployed based on the present configuration and priority assessment. The system manager controls the transceiver configuration (transceiver band/mode settings, etc.) in this embodiment. Deployment can be re-evaluated periodically to determine if the configuration can return to the user-defined configuration and still provide acceptable quality of service (e.g., based on error rate or signal quality performance of the two CDMA2000 diversity receivers, one of them, such as the one with poorer quality signal, may be redeployed to GPS mode if the other one is deemed capable of performing at an acceptable quality level without diversity). Note that the subsequent configuration may differ from the previous configuration—that is, the first transceiver may be redeployed as GPS, while the third transceiver now stays at the CDMA2000 configuration because its antenna is more favorably oriented.

As another example, the first transceiver may be deployed as a CDMA2000 data link. If a large file download is required to take place, the infrastructure operator may determine that the radio is a unit capable of MIMO operation, and request that it assume that operating mode. The system manager 110 would then determine which resource to re-deploy, and would in this case enable MIMO by temporarily reassigning the GPS receiver in order to expedite the download. Once the download has been completed, the temporarily reassigned receiver may revert to its previous mode, or to another mode as needed.

In the examples shown above, it is assumed that all of the communication resources are configurable. However, this should not be considered limiting since one or more resources may be fixed and non-reconfigurable. Consider for example a GSM/EDGE (GSM with Enhanced Data rates for GSM Evolution) telephone handset. If it is known that the desired mode of operation with highest priority is always GSM/EDGE, a fixed resource may be designed. Reconfigurable resources may supplement this configuration as, for example, a GPS receiver and an IEEE 802.11 compliant transceiver. If these resources are generally or at a given moment lower priority, they might be reconfigured as needed to GSM/EDGE transceivers or receivers and thus enhance the reliability of the GSM/EDGE communication mode.

Receivers, transmitters and transceivers are equally amenable to use in the present invention. In the case of multiple transmitters in a multiple mode communication device consistent with certain embodiments of the present invention, a first RF communication transmitter that by default transmits RF signals using a first communication mode. A second RF communication transmitter by default transmits signals using a second communication mode. A system manager deploys at least one of the first and second communication transmitters according to a set of deployment rules, wherein the deployment rules define the conditions under which a particular resource is deployed. These deployment rules may be dependent upon a communication quality parameter or other parameters. For example, if two transmitters are deployed as a WCDMA and an 802.11b uplink, the 802.11b transmitter may be temporarily redeployed as a WCDMA MIMO transmitter to expedite the transfer of a large file from the user.

Figure 6:
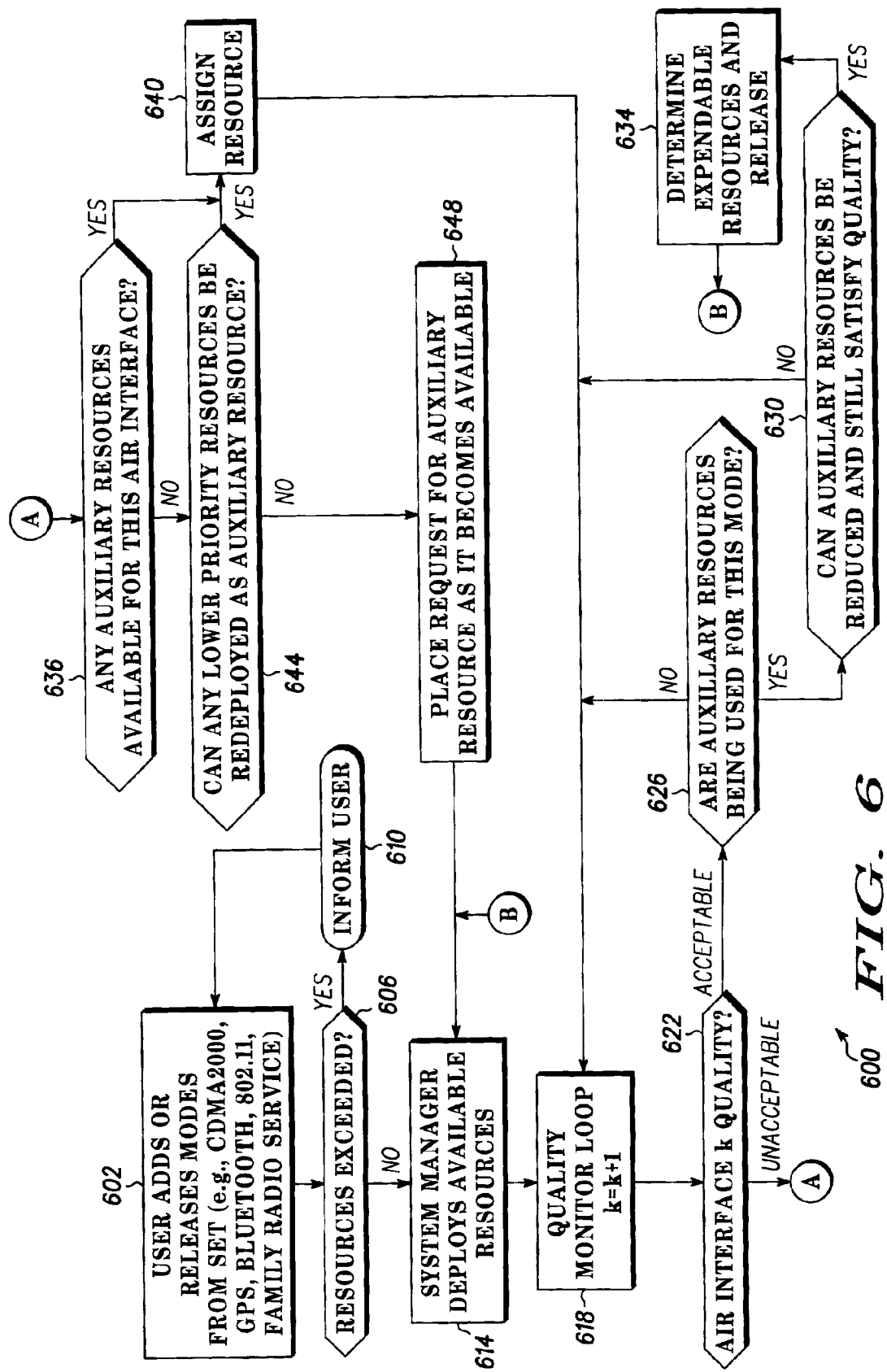

A multiple mode transceiver arrangement such as 300 may be deployed in accordance with a process such as process 600 of FIG. 6. At 602, the user configures the available communication resources until the resources reach their limit. If the resources are exceeded at 606, the user is informed at 610. Otherwise, the system manager 110 deploys the available resources at 614 by sending configuration control information to the various configurable components. For each of the defined operational modes (numbered k), the system manager 110 checks the quality indicator at 618. If the link quality of the current resource is acceptable at 622, the system manager 110 determines if additional (auxiliary) resources are being used for the current mode (k) at 626. If not, (i.e., if only the default resource is being utilized to obtain acceptable quality), the next mode (k+1) is inspected at 618. However, if additional auxiliary resources are being used to achieve this acceptable level of quality, the system manager 110 determines at 630 whether or not those resources can be released. If not, control returns to 618 where the next operational mode is inspected. If resources can be released, the system manager 110 releases those resources at 634 and control returns to 614 where the released resources may be reallocated.

If, at 622, the quality of the current mode (k) is unacceptable, the resource manager determines if any additional auxiliary resources are available for redeployment at 636 in accordance with the deployment rules. If so, those resources are redeployed at 640. If not, the system manager 110 determines if any lower priority resources can be redeployed as an auxiliary resource to enhance the quality of the current mode (k). If so, control passes to 640. If not, a request is logged for an auxiliary resource as soon as it becomes available at 648 and control returns to 614.

Those skilled in the art will appreciate that the process 600 described above is simplified to facilitate understanding. The current mode (k) is incremented in the process above until the largest numbered resource is reached and then k is reset so that the system manager 110 continuously monitors the quality of each mode of operation.

Those skilled in the art will recognize that the present invention has been described in terms of exemplary embodiments based upon use of a programmed processor to implement system manager 110. However, the invention should not be so limited, since the present invention could be implemented using hardware component equivalents such as special purpose hardware and/or dedicated processors that are equivalents to the invention as described and claimed. Similarly, general purpose computers, microprocessor based computers, micro-controllers, optical computers, analog computers, dedicated processors and/or dedicated hard wired or reconfigurable logic may be used to construct alternative equivalent embodiments of the present invention.

Those skilled in the art will appreciate that the program steps and associated data used to implement the embodiments described above can be implemented using any suitable electronic storage medium such as disc storage, Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor as system manager 110 executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A multiple mode RF communication device, comprising:

a first RF communication resource that communicates by default using a first communication mode;

a second RF communication resource that communicates by default using a second communication mode; and a system manager that deploys at least one of the first and second communication resources according to a set of deployment rules, wherein the deployment rules are dependent upon at least a communication quality parameter and wherein the deployment rules determine the configuration of the deployed at least one of the first and second communication resources, and wherein the system manager deploys the second RF communication resource to operate in the first mode by issuing control commands to chance an operational frequency of the second RF communication resource, and further issues control commands to change at least one of modulation scheme, demodulation scheme, data encoding, and data decoding scheme.

2. The multiple mode RF communication device according to claim 1, further comprising:

a third RF communication resource that communicates by default using a third communication mode; and wherein the system manager further deploys the third communication resource according to the set of deployment rules.

3. The multiple mode RF communication device according to claim 2, wherein the first, second and third communication resources comprise at least one of a transmitter and a receiver.

4. The multiple mode RF communication device according to claim 2, wherein at least one of the first, second and third modes comprise at least one of the following: a CDMA mode, a GSM/EDGE mode, a WCDMA compliant mode, a Bluetooth mode, an IEEE 802.11 mode and a GPS mode.

5. The multiple mode RF communication device according to claim 1, the first and second communication resources comprise at least one of a transmitter and a receiver.

6. The multiple mode RF communication device according to claim 1, wherein at least one of the first and second modes comprise at least one of the following: a CDMA mode, a GSM/EDGE mode, a WCDMA mode, a Bluetooth mode, an IEEE 802.11 compliant mode and a GPS mode.

7. The multiple mode RF communication device according to claim 1, wherein the first and second RF communication resources operate at first and second frequency bands by default.

8. The multiple mode RF communication device according to claim 1, wherein the second RF communication resource is deployed to operate in the first mode by the system manager in accordance with the deployment rules.

9. The multiple mode RF communication device according to claim 1, wherein the at least one of the first and second RF communication resources is deployed based upon a priority.

10. The multiple mode RF communication device according to claim 1, wherein the second RF communication resource reverts to operating in the second mode after being deployed to operate in the first mode by the system manager in accordance with the deployment rules.

11. The multiple mode RF communication device according to claim 1, wherein the second RF communication resource communicates in a third mode after being deployed to operate in at least one of the first mode and the second mode by the system manager in accordance with the deployment rules.

12. The multiple mode RF communication device according to claim 1, wherein the first and second RF communication resources are deployed in an antenna diversity configuration.

13. The multiple mode RF communication device according to claim 11, wherein the antenna diversity is configured for receive diversity.

14. The multiple mode RF communication device according to claim 11, wherein the antenna diversity is configured for transmit diversity.

15. The multiple mode RF communication device according to claim 1, wherein the first and second RF communication resources are deployed in a MIMO configuration.

16. A multiple mode RF communication device, comprising:
   a first RF communication receiver that by default receives RF signals using a first communication mode;
   a second RF communication receiver that by default receives signals using a second communication mode; and
   a system manager that deploys the first and second communication receivers according to a set of deployment rules, wherein the deployment rules are dependent upon at least a communication quality parameter and availability of the first and second communication receivers and wherein the deployment rules determine the configuration of the deployed at least one of the first and second communication receivers, and
   wherein the system manager deploys the second RF communication receiver to operate in the first mode by issuing control commands to change an operational frequency of the second RF communication receiver, and further issues control commands to change at least one of a demodulation scheme and a data decoding scheme.

17. The multiple mode RF communication device according to claim 16, wherein at least one of the first and second modes comprise at least one of the following: a CDMA mode, a GSM/EDGE mode, a WCDMA mode, a Bluetooth mode, an IEEE 802.11 compliant mode and a GPS mode.

18. The multiple mode RF communication device according to claim 16, wherein the first and second RF communication receivers operate at first and second frequency bands by default.

19. The multiple mode RF communication device according to claim 16, wherein the second RF communication receiver is deployed to operate in the first mode by the system manager in accordance with the deployment rules.

20. The multiple mode RF communication device according to claim 16, wherein the at least one of the first and second RF communication receivers is deployed based upon a priority.

21. The multiple mode RF communication device according to claim 16, wherein the first and second RF communication receivers are deployed in an antenna diversity configuration.

22. The multiple mode RF communication device according to claim 16, wherein the first and second RF communication receivers are deployed in a MIMO configuration.

23. A multiple mode RF communication device, comprising:
   a first RF communication transmitter that by default transmits RF signals using a first communication mode;
   a second RF communication transmitter that by default transmits signals using a second communication mode; and
   a system manager that deploys the first and second communication transmitters according to a set of deployment rules, wherein the deployment rules are dependent upon at least a communication quality parameter and availability of the first and second communication transmitters and wherein the deployment rules determine the configuration of the deployed at least one of the first and second communication transmitters, and;
   wherein the system manager deploys the second RF communication transmitter to operate in the first mode by issuing control commands to change an operational frequency of the second RF communication transmitter, and further issues control commands to change at least one of a modulation scheme and a data encoding scheme.

24. The multiple mode RF communication device according to claim 23, wherein at least one of the first and second modes comprise at least one of the following: a CDMA mode, GSM/EDGE mode, a WCDMA mode, a Bluetooth mode, and an IEEE 802.11 compliant mode.

25. The multiple mode RF communication device according to claim 21, wherein the first and second RF communication transmitters operate at first and second frequency bands by default.

26. The multiple mode RF communication device according to claim 23, wherein the second RE communication transmitter is deployed to operate in the first mode by the system manager in accordance with the deployment rules.

27. The multiple mode RF communication device according to claim 23, wherein the at least one of the first and second RF communication transmitters is deployed based upon a priority.

28. A multiple mode RF communication device, comprising:
   a first RF communication resource that communicates by default using a first communication mode and a first frequency band;
   a second RF communication resource that communicates by default using a second communication mode and a second frequency band;
   a third RF communication resource that communicates by default using a third communication mode and a third frequency band; and
   a system manager that deploys at least one of the second and third communication resources to operate using the first communication mode and the first frequency band according to a set of deployment rules,
   wherein the deployment rules are dependent upon at least a communication quality parameter received from at least one of the first, second and third RF communication resources, and upon a priority, and wherein the deployment rules determine the configuration of the deployed at least one of the first, second, and third RF communication resources,
   wherein the first, second and third communication resources comprise at least one of a transmitter and a receiver,
   wherein the system manager deploys the second RF communication resource to operate in the first mode by issuing control commands to change an operational frequency of the second RF communication resource, and further issues control commands to change a data encoding scheme, and wherein at least one of the first, second and third modes comprise at least one of the following: a CDMA mode, a GSM/EDGE mode, a WCDMA mode, a Bluetooth mode, an IEEE 802.11 mode and a GPS mode.

* * * * *

UNITED STATES PATENT AND TRADEMARK OFFICE
CERTIFICATE OF CORRECTION

PATENT NO. : 6,954,446 B2 Page 1 of 1
APPLICATION NO. : 10/179551
DATED : October 11, 2005
INVENTOR(S) : Kuffner It is certified that error appears in the above-identified patent and that said Letters Patent is hereby corrected as shown below:

Column 8
In claim 1, line 19, change "chance" to --change--

Column 10
In claim 25, line 25 change "claim 21" to --claim 23--

Column 10
In claim 26, line 29 change "RE" to --RF--

Column 10
In claim 28, line 4, change "mode, an IEEE 802.11 mode and a GPS mode." To --mode, an IEEE 802.11 compliant mode and a GPS mode.--

Signed and Sealed this

Seventeenth Day of October, 2006

JON W. DUDAS
*Director of the United States Patent and Trademark Office*